(12) United States Patent
Ota

(10) Patent No.: US 7,131,677 B2
(45) Date of Patent: Nov. 7, 2006

(54) WEEDER

(75) Inventor: Kinjiro Ota, Tokyo (JP)

(73) Assignee: Ota Kosan Corporation, Tokyo (JP)

( * ) Notice: Subject to any disclaimer, the term of this patent is extended or adjusted under 35 U.S.C. 154(b) by 107 days.

(21) Appl. No.: 10/852,004

(22) Filed: May 24, 2004

(65) Prior Publication Data

US 2004/0245003 A1    Dec. 9, 2004

(30) Foreign Application Priority Data

May 23, 2003  (JP)  ............................. 2003-146904

(51) Int. Cl.
  *A01B 1/16*      (2006.01)
(52) U.S. Cl. ..................................... 294/50.9; 172/371
(58) Field of Classification Search ............... 294/50.8, 294/50.9; 172/371, 372
See application file for complete search history.

(56) References Cited

U.S. PATENT DOCUMENTS

| 1,526,652 A | * | 2/1925 | Wilson | ........................ 254/132 |
| 1,553,719 A | * | 9/1925 | Rhoads | ....................... 294/50.5 |
| 1,634,606 A | * | 7/1927 | Bartlebaugh | ............... 294/50.5 |
| 1,860,963 A | * | 5/1932 | Smith | ........................... 111/101 |
| 3,152,788 A | * | 10/1964 | Hardwidge | ................. 254/132 |
| 5,402,853 A | * | 4/1995 | Tauber | ........................ 172/378 |
| 5,615,541 A | | 4/1997 | Ota | |
| 6,691,793 B1 | * | 2/2004 | Ota | ............................. 172/371 |

FOREIGN PATENT DOCUMENTS

JP       2002142501       5/2002

* cited by examiner

*Primary Examiner*—Eileen D. Lillis
*Assistant Examiner*—Esther Onyinyechi Okezie
(74) *Attorney, Agent, or Firm*—Dann, Dorfman, Herrell and Skillman, P.C.

(57) ABSTRACT

A weeder includes a longitudinal shaft having a predetermined length and a longitudinal bore, a chuck mechanism provided at a lower end portion of the longitudinal shaft for pinching and pulling out weeds in the ground, the chuck mechanism including first and second pinching members for pinching the weeds therebetween, a first remover member combined with the chuck mechanism for forcedly removing the weeds and/or mud from the first pinching member, a second remover member combined with the chuck mechanism for forcedly removing the weeds and/or mud from the second pinching member, an operating lever mechanism provided on an axis of the longitudinal shaft for actuating the first and second pinching members and the first and second remover members, and a towing wire inserted and extending within the longitudinal bore of the longitudinal shaft, and coupling the chuck mechanism and the operating lever mechanism.

1 Claim, 11 Drawing Sheets

WEEDER

BACKGROUND OF THE INVENTION

1. Field of the Invention

This invention relates to a weeder which a user can handle in a standing posture when the user is to pick up a weed or weeds (hereinafter referred to as "weeds") in the ground by using the weeder.

2. Description of the Related Art

This type of weeder is disclosed in Japanese Patent Application (for an invention made by an inventor of the present invention and assigned to the assignee of the present application) which was laid open to public inspection on May 21, 2002 under Provisional Publication No. 2002-142501. The conventional weeder includes a longitudinal cylindrical or pipe-like shaft, an operating lever means pivotally supported via a support pin to a portion of the longitudinal cylindrical shaft which is adjacent an upper end portion of the longitudinal cylindrical shaft, chuck means provided at a lower end portion of the longitudinal cylindrical shaft for pinching and pulling out weeds in the ground, and a towing wire received and extending within a longitudinal bore of the longitudinal cylindrical shaft, and coupling the operating lever means and the chuck means. When a user grasps the upper end portion of the longitudinal cylindrical shaft and manually operates the operating lever means so as to cause the operating lever means to approach an axis of the longitudinal cylindrical shaft, the chuck means is adapted to be actuated.

The chuck means of the conventional weeder includes a base frame provided at the lower end portion of the longitudinal cylindrical shaft, a first pinching piece provided at the base frame so as to extend downward from the base frame, a swinging frame pivotally supported to the base frame, and a second pinching piece provided at the swinging frame.

When the user is to pick up weeds in the ground by using the conventional weeder, the user grasps the longitudinal cylindrical shaft in a standing posture and places the first pinching piece on an area of the ground in which the weeds grow. In this condition, when the user operates the operating lever means so as to cause the operating lever means to approach the axis of the longitudinal cylindrical shaft, the swinging frame is swung, whereby the second pinching piece approaches the first pinching piece. As a result, the weeds are pinched between the first pinching piece and the second pinching piece. In this condition, when the user pulls the longitudinal cylindrical shaft up, the weeds can be pulled out.

In the conventional weeder, a grasping force of the operating lever means by the user is transmitted to the chuck means as a weed-chucking force or a weed-pinching force, whereby the weeds are strongly pinched by the first and second pinching pieces. Therefore, when the user pulls the weeder up in condition where the weeds are pinched between the pinching pieces, the weeds can be positively pulled out by the roots. When the operating lever means is released from the user's hand, the swinging frame is adapted to be swung in such a manner that the second piece is moved away from the first pinching piece. By the movement of the second pinching piece away from the first pinching piece, the weeds are released from the first and second pinching pieces.

However, the releasing of the weeds from the first and second pinching pieces is carried out with resort to the movement of the second pinching piece away from the first pinching piece, so that when the second pinching piece is moved away from the first pinching piece, there is a possibility that the weeds and/or mud will remain attached to the first pinching piece and/or the second pinching piece.

SUMMARY OF THE INVENTION

The present invention has been made with a view to overcoming the foregoing problem of the prior art weeder.

It is an object of this invention to provide a weeder that can positively remove weeds and/or mud from the weeder, even if the weeds and/or mud remain adhering to the weeder after the weeds are pulled out by the weeder.

It is another object of this invention to provide a weeder that can securely pull out weeds by the roots even if the weeds take strong roots.

It is still another object of this invention to provide a weeder that is simple in construction.

In accordance with the present invention, there is provided a weeder which a user can handle in a standing posture. The weeder comprises a longitudinal shaft having a predetermined length and a longitudinal bore, chuck means provided at a lower end portion of the longitudinal shaft for pinching and pulling out weeds in the ground, the chuck means including first and second pinching means for pinching the weeds therebetween, first remover means combined with the chuck means for forcedly removing the weeds and/or mud from the first pinching means, second remover means combined with the chuck means for forcedly removing the weeds and/or mud from the second pinching means, operating lever means provided on an axis of the longitudinal shaft for actuating the first and second pinching means and the first and second remover means, and a towing wire inserted and extending within the longitudinal bore of the longitudinal shaft, and coupling the chuck means and the operating lever means.

The chuck means may include an elongated base frame provided at the lower end portion of the longitudinal shaft, the elongated base frame having a first vertically extending hole, a movable member movably received in the longitudinal bore of the longitudinal shaft from a lower end portion of the base member, the movable member being provided with engaging means projecting laterally therefrom, a coil spring mounted around the movable member, and a swinging member. The towing wire is coupled at a lower end thereof to the movable member.

The first pinching means may include a body of a substantially L-shape in vertical-section which comprises a first vertically extending plate-shaped section serving as means to pinch the weeds in cooperation with the second pinching means, the first vertically extending plate-shaped section having a second vertically extending hole, and a second plate-shaped section serving as means for facilitating standing of the chuck means over the ground, the second plate-shaped section obliquely and upwardly extending from a lower end of the first vertically extending plate-shaped section. The first plate-shaped section is provided at upper regions of both side edges thereof with bracket pieces which extend in the direction opposite to the direction in which the second plate-shaped section extends. The first pinching means is supported to the base frame by causing the first vertically extending plate-shaped section to be secured to the base frame.

The swinging member may include a pair of first spaced apart plate-shaped sections, a first intermediate plate-shaped section interconnecting the first spaced apart plate-shaped sections, and a connecting pin provided between the first spaced apart plate-shaped sections. The second pinching means is provided at the first intermediate section of the swinging member. The swinging member is pivotally supported to the bracket pieces of the first pinching means with the connecting pin thereof being engaged with the engaging means of the movable member.

The first remover means may include an elongated-plate-shaped body having notches formed in both sides thereof. The elongated-plate-shaped body is angularly bent at a lower end portion thereof, whereby a first remover blade is provided at the lower end portion of the first remover means. The first remover means is applied onto a surface of the first vertically extending plate-shaped section of the first pinching means and supported to the movable member so as to be vertically slidable on the surface of the first vertically extending plate-shaped section of the first pinching means, by a pin which penetrates through the second vertically extending hole of the first pinching means and the first vertically extending hole of the base frame.

The second remover means may include a pair of second spaced apart plate-shaped sections, a second intermediate plate-shaped section interconnecting the second spaced apart plate-shaped sections, and a second remover blade provided at the second intermediate plate-shaped section of the second remover means. The second spaced apart plate-shaped sections have third vertically extending holes formed therein and protruding pieces provided at upper ends thereof. The second remover means is received in the swinging member with the protruding pieces thereof being engaged with the notches of the first remover means, with the second remover blade being contacted with the second pinching means, and with the third vertically extending hole thereof receiving guide pins which penetrate through the first spaced apart plate-shaped sections of the swinging member.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION OF THE PREFERRED EMBODIMENT

A weeder according to the present invention will be discussed hereinafter with reference to the accompanying drawings.

Figure 1:
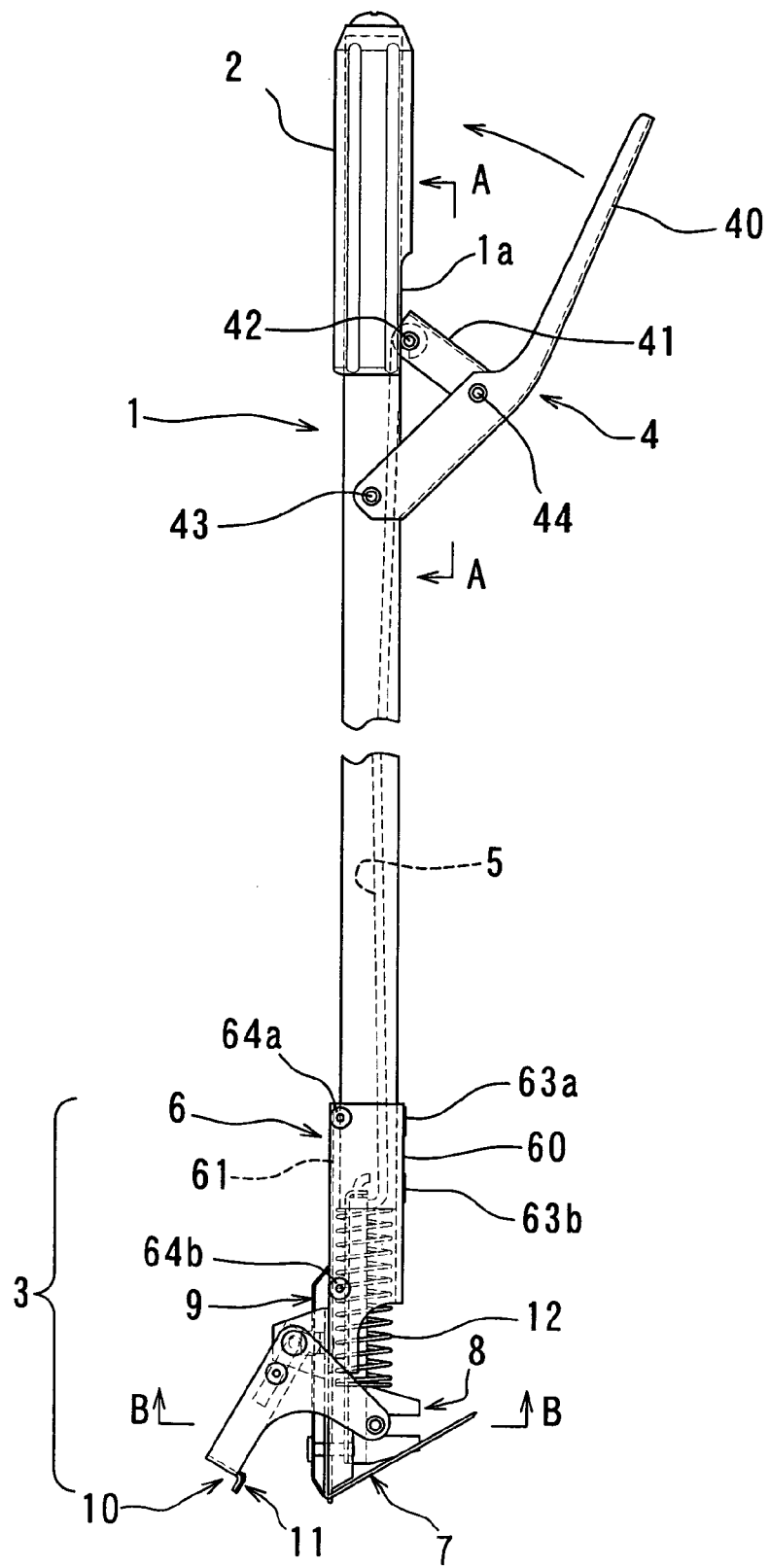
FIG. 1 is a schematic side view of the entire weeder according to an embodiment of the present invention.

Referring to FIG. 1, there is illustrated a weeder according to an embodiment of the present invention. The weeder generally includes a longitudinal cylindrical or pipe-shaped shaft 1 having a predetermined length long enough to allow a user to handle the weeder in a standing posture, and a longitudinal bore, gripping means 2 provided at an upper end portion of the longitudinal cylindrical shaft 1, chuck means 3 provided at a lower end portion of the longitudinal cylindrical shaft 1 for pinching weeds in the ground and pulling out the weeds, operating lever means 4 provided on an axis of the longitudinal cylindrical shaft 1 for actuating the chuck means 3, and a towing wire 5 inserted and extending within the longitudinal bore of the longitudinal cylindrical shaft 1 and coupling the chuck means 3 and the operating lever means 4. In use of the weeder, the gripping means 2 is to be grasped by the user and the operating lever means 4 is to be actuated by the user. In the illustrated embodiment, the components of the weeder other than the gripping means 2 are made of metal, and the gripping means 2 is made of rubber.

Figure 2:
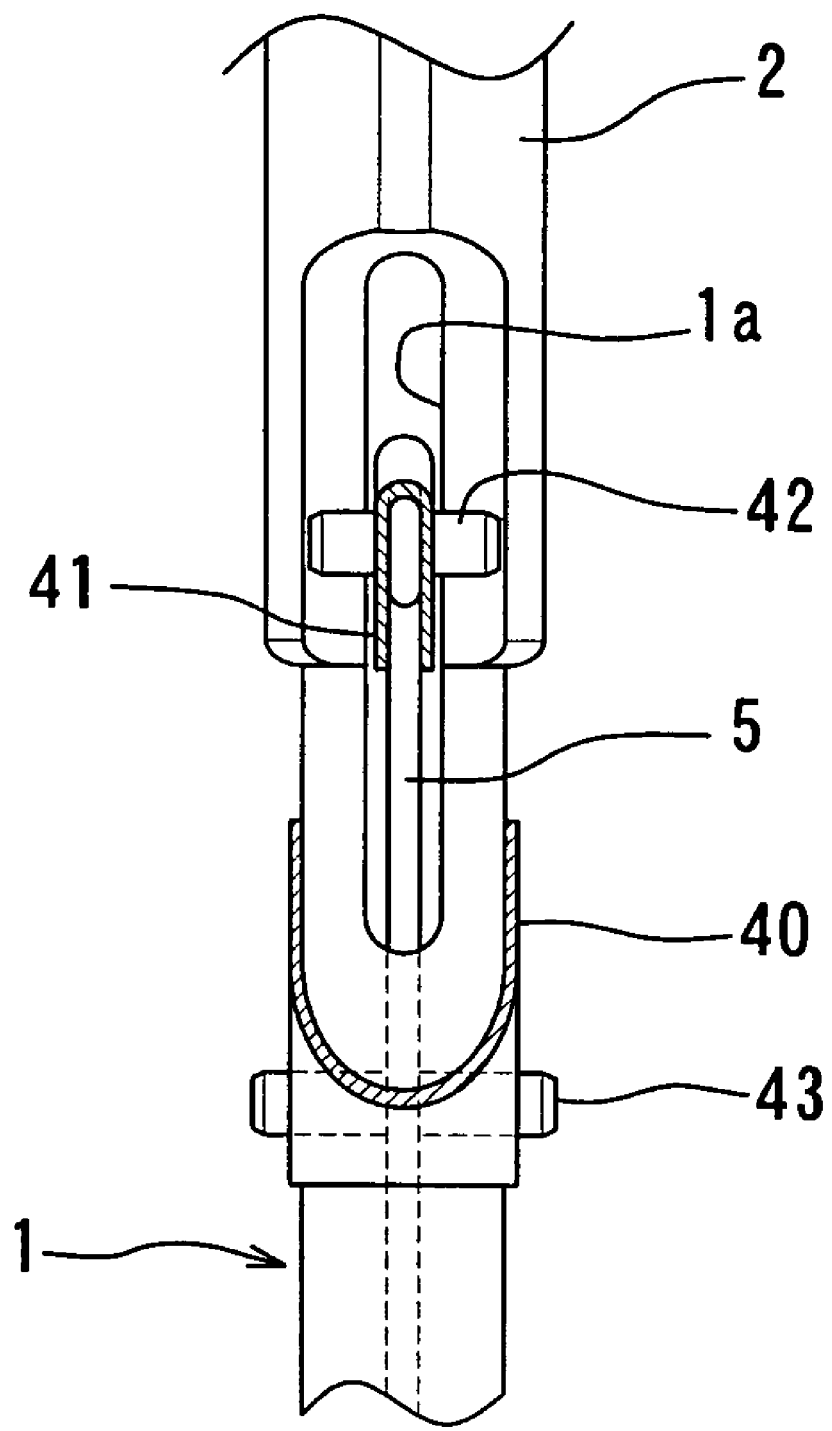
FIG. 2 is a schematic sectional view of gripping means and operating lever means of FIG. 1, taken on a plane indicated in FIG. 1 by a line A—A.

Again referring to FIG. 1 and referring to FIG. 2, the operating lever means 4 includes a lever body 40, an operating piece 41, and a guide pin 42. The lever body 40 is formed into a substantially U-shape in cross-section. The lever body 40 is pivotally supported at an end portion thereof to the axis of the longitudinal cylindrical shaft 1 by means of a support pin 43 with both sides of the end portion of the lever body 40 straddling the axis of the longitudinal cylindrical shaft 1, and obliquely extends upwardly in such a direction as to be away from the longitudinal cylindrical shaft 1. The operating piece 41 is formed into a substantially U-shape in cross-section and has first and second end portions. The operating piece 41 is received at the first end portion thereof in the lever body 40 having a substantially U-shape in cross-section as discussed above, pivotally supported at the first end portion thereof to the approximately middle portion of a longitudinal direction of the lever body 40 by means of a support pin 44, and obliquely extends upwardly toward the gripping means 2. The guide pin 42 is provided at the second end portion of the operating piece 41 in such a manner to penetrate through both sides of the substantially U-shaped operating piece 41.

A combination comprising the longitudinal cylindrical shaft 1 and the gripping means 2 is formed with a vertically extending slit 1a in a lower end portion of the gripping means 2 and a portion of the longitudinal cylindrical shaft 1 which positionally corresponds to the lower end portion of the gripping means 2. The second end portion of the operating piece 41 is received in the vertically extending slit 1a in such a manner that the guide pin 42 can be slid along the vertically extending slit 1a. The towing wire 5 is engaged at an upper end thereof with an axis of the guide pin 42 by hooking the upper end of the towing wire 5 on the axis of the guide pin 42. The towing wire 5 is coupled at a lower end thereof to the chuck means 2 as will be discussed in greater detail hereinafter.

When the lever body 40 is pivoted about the support pin 43 by the user's hand in such a direction as to approach the gripping means 2 as indicated by an arrow in FIG. 1, the operating piece 41 is moved upwardly. Simultaneously, the guide pin 42 is slid upwardly along the vertically extending slit 1a while pulling the towing wire 5 upwardly, thereby actuating the chuck means 3 as will be discussed in greater detail hereinafter.

Referring to FIGS. 3 to 6, there is illustrated the chuck means 3. The chuck means 3 includes a base frame 6, a first pinching member 7 for pinching weeds in the ground, and a movable member 8, and a swinging member 10 provided with a second pinching piece 106 for pinching the weeds in cooperation with the first pinching member 7. As will be discussed in greater detail hereinafter, when the operating lever means 4 is operated and the movable member 8 is moved upward, the swinging member 10 is adapted to be swung in a manner that the second pinching piece 106 approaches the first pinching member 7, whereby the weeds are pinched between the first pinching member 7 and the second pinching piece 106 provided at the swinging member 10.

The weeder according to the present invention further includes a first remover member 9 for forcedly removing weeds and/or mud from the first pinching member 7, and a second remover member 11 for forcedly removing weeds and/or mud from the second pinching piece 106 of the swinging member 10.

Figure 3:
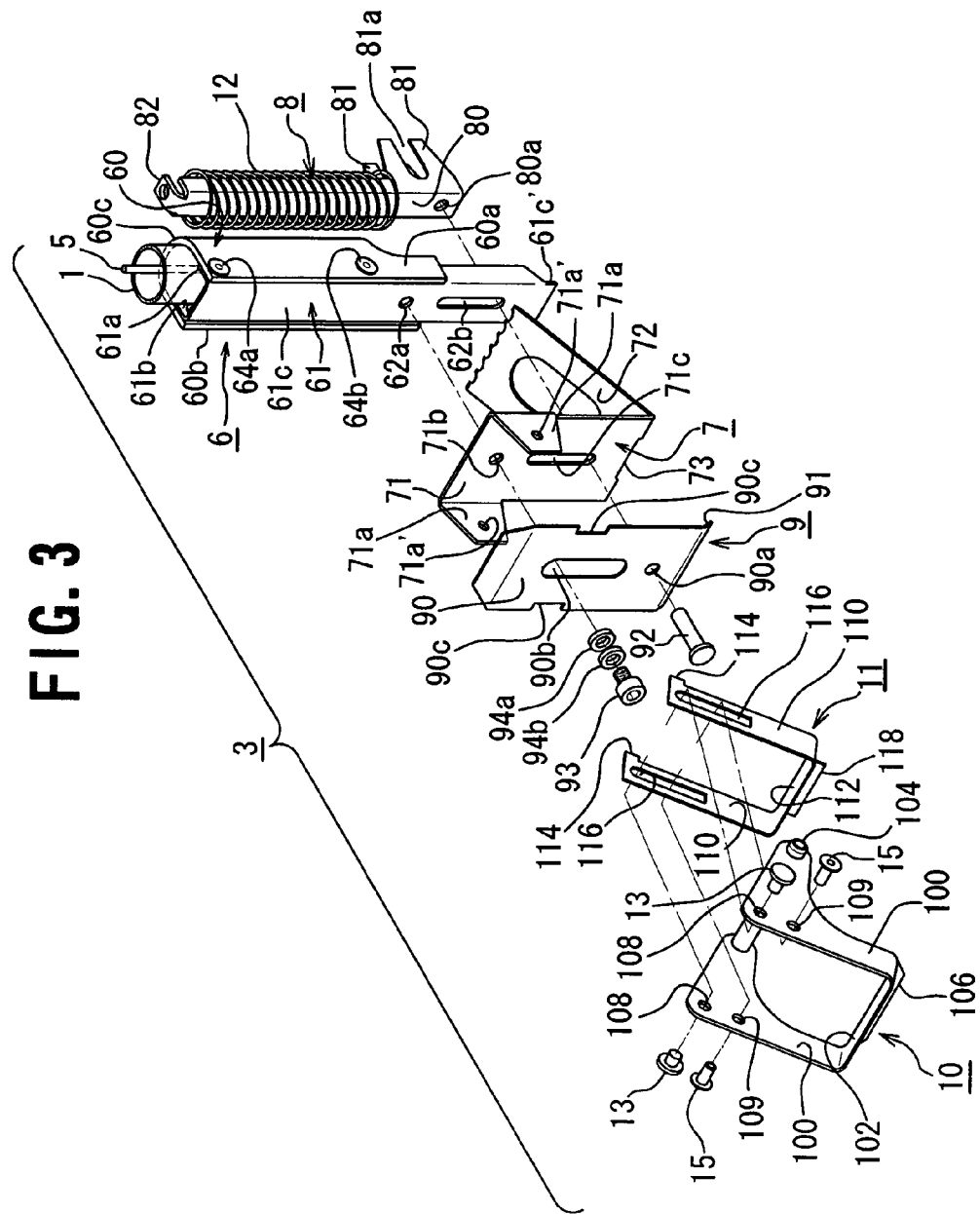
FIG. 3 is a schematic exploded perspective view of chuck means of the weeder shown in FIG. 1.
Figure 4:
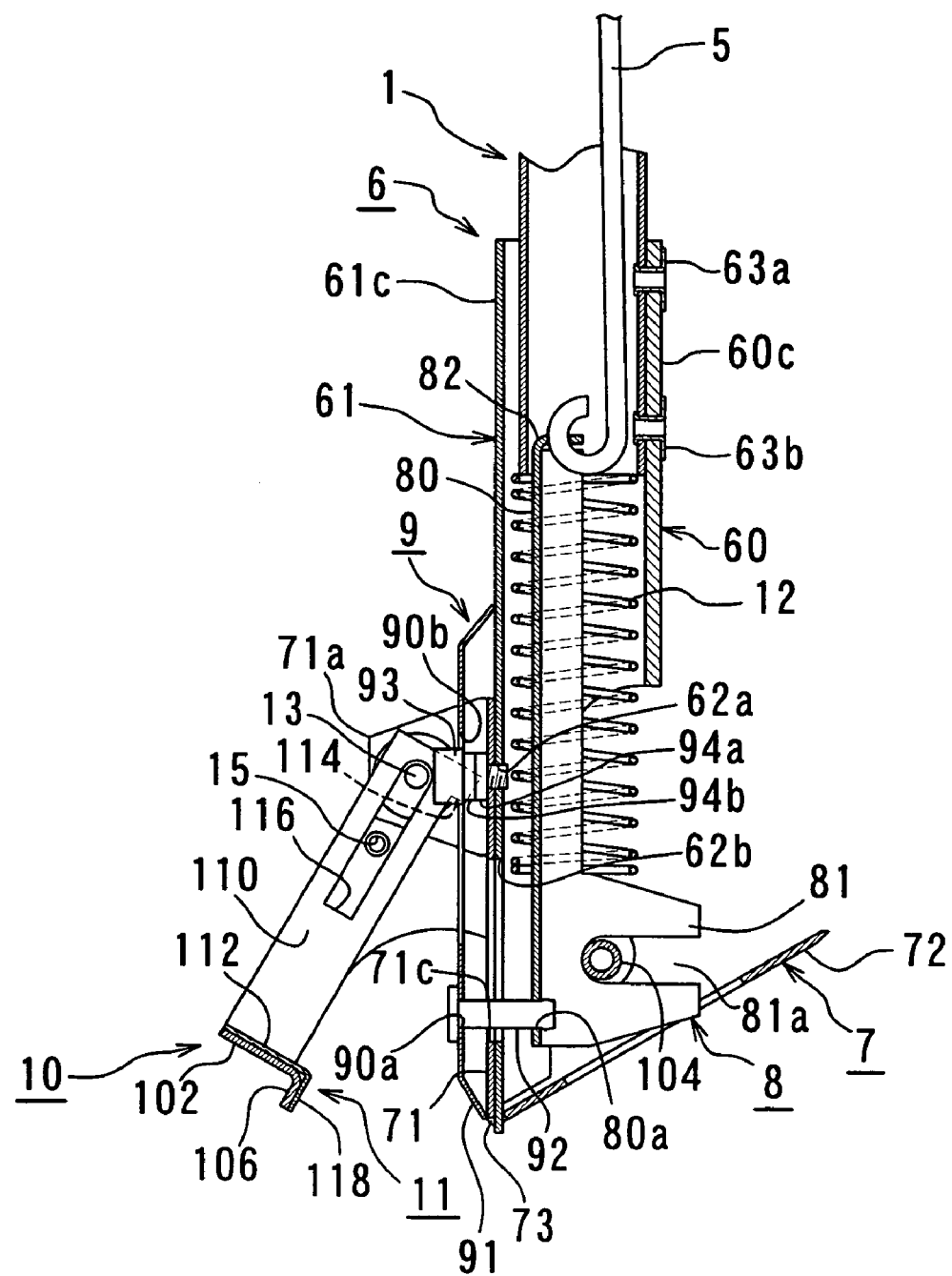
FIG. 4 is a schematic sectional side view of the chuck means that is in an assembled condition.
Figure 5:
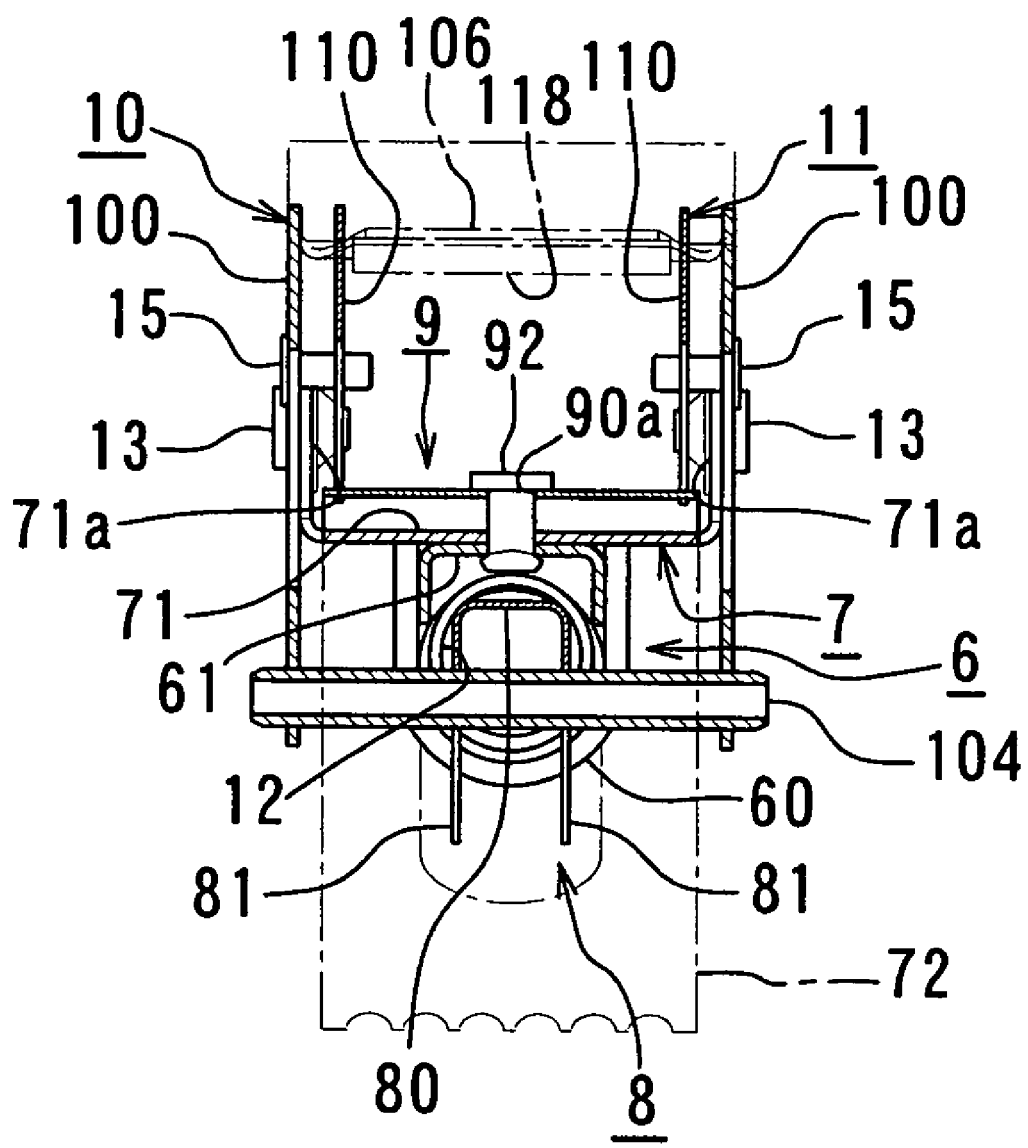
FIG. 5 is a schematic sectional view of the chuck means of the weeder of FIG. 1, taken on a plane indicated in FIG. 1 by a line B—B.
Figure 6:
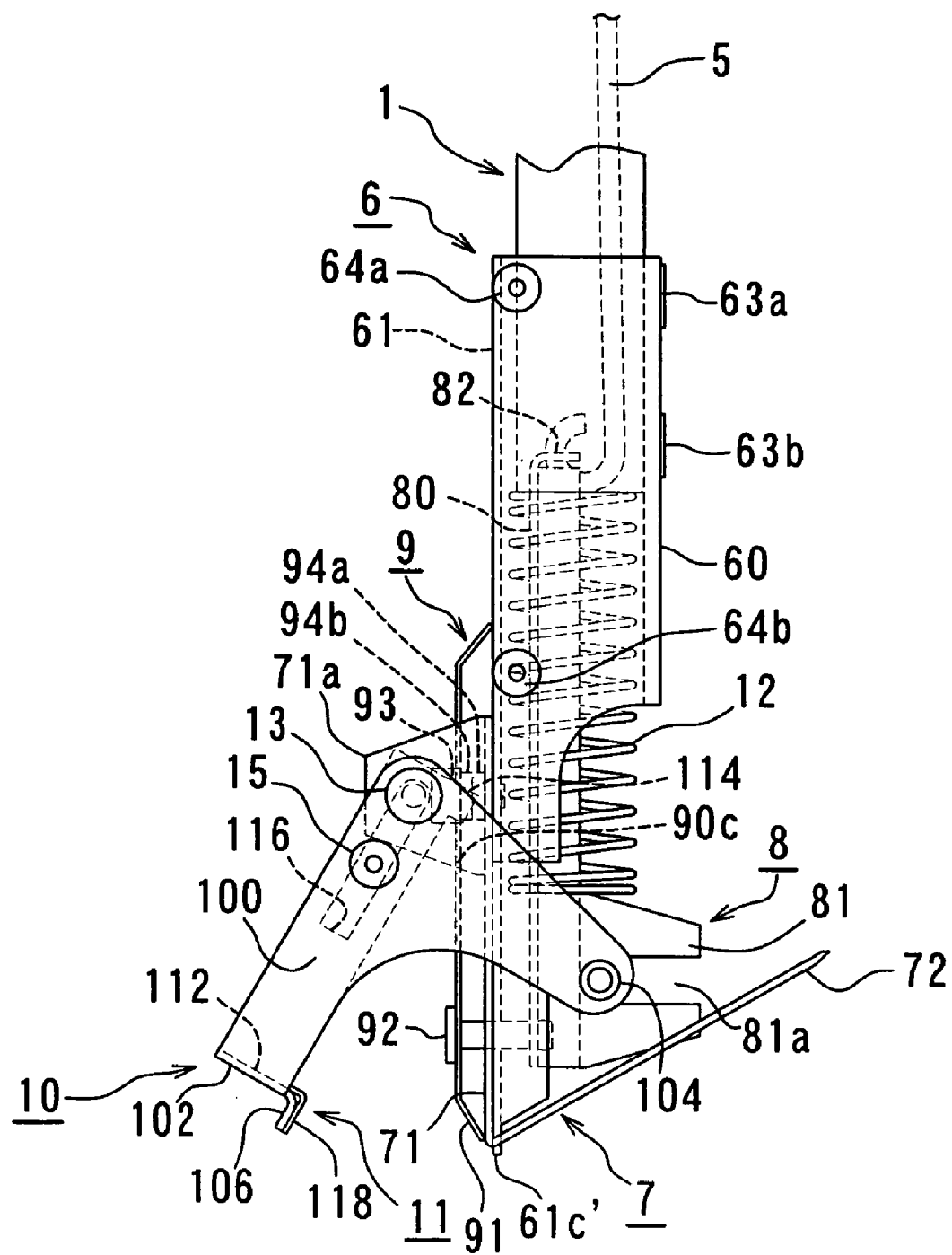
FIG. 6 is a schematic side view of the chuck means.

The base frame 6 includes a first elongated frame section 60 of a substantially U-shape in cross-section and a second elongated frame section 61 of a substantially U-shape in cross-section. The first elongated frame section 60 comprises a first pair of spaced apart portions 60a, 60b and a first intermediate portion 60c of a substantially semicircular shape in cross-section interconnecting the first spaced apart portions 60a, 60b. The second elongated frame section 61 comprises a second pair of spaced apart portions 61a, 61b and a second intermediate portion 61c interconnecting the second spaced apart portions 61a, 61b. The second intermediate portion 61c is formed with a tapped hole 62a and a vertically extending hole 62b. A lower end 61c' of the second intermediate portion 61c of the second elongated frame section 61 is slightly projected downwardly from the second spaced apart portions 61a, 61b. The second elongated frame section 61 has a length longer than a length of the first elongated frame section 60. The first elongated frame section 60 is mounted around the lower end portion of the longitudinal cylindrical shaft 1 with the substantially semicircular-shaped intermediate portion 60c thereof being fastened to the lower end portion of the longitudinal cylindrical shaft 1 by means of rivets 63a, 63b as shown in FIG. 4. The second elongated frame section 61 is received in a space between the first spaced apart portions 60a, 60b of the first elongated frame section 60 with the second intermediate portion 61c thereof facing the first semicircular-shaped intermediate portion 60c of the first elongated frame section 60, fastened to the first elongated frame section 60 by means of rivets 64a, 64b as shown in FIG. 3, and projected downwardly from the first elongated frame section 60. The first elongated frame section 60 of the base frame 6 is notched in a lower end region thereof.

The first pinching member 7 includes a body of a substantially L-shape in vertical-section which comprises a first vertically extending plate-shaped section 71, a second plate-shaped section 72 obliquely and upwardly extending from a lower end of the first vertically extending plate-shaped section 71, and a notch 73 formed in a portion between the first and second plate-shaped sections 71, 72. The first plate-shaped section 71 is provided at both side edges thereof with bracket pieces 71a which extend in the direction opposite to the direction in which the second plate-shaped section 72 extends. The first plate-shaped section 71 of the first pinching member 7 is formed with a tapped hole 71b and a vertically extending hole 71c. The bracket pieces 71a of the first pinching member 7 are formed with holes 71a'. As will be discussed in greater detail hereinafter, the first pinching member 7 is mounted to the second frame section 61 of the base frame 6 with the vertically extending plate-shaped section 71 thereof being attached to the second intermediate portion 61c of the second frame section 61 and with the notch 73 thereof receiving the downwardly projecting lower end 61c' of the second intermediate portion 61c of the second elongated frame section 61 therein. The downwardly projecting lower end 61c' is projected downwardly from the notch 73 of the first pinching member 7.

The first vertically extending plate-shaped section 71 of the first pinching member 7 serves as means to pinch weeds in the ground in cooperation with the first pinching piece 106 of the swinging member 10. The second plate-shaped section 72 of the first pinching member 7 serves as grounding means for facilitating standing of the chuck means 3 over the ground.

The movable member 8 includes an elongated body 80 of a substantially U-shape in cross-section, and a pair of spaced apart engaging pieces 81 projecting laterally from a lower portion of the elongated body 80. The elongated body 80 is formed with a stopper hole 80a in a lower portion thereof. The spaced apart engaging pieces 81 are formed with notches 81a that are aligned with each other. Each of the notches 81a has a substantially U-shape. The movable member 8 is movably received in the longitudinal bore of the longitudinal cylindrical shaft 1 from the lower end of the first frame section 60 of the base frame 6. The movable member 8 is provided at an upper end thereof with a bent piece 82 to which the lower end of the towing wire 5 is coupled. A coil spring 12 is mounted around the movable member 8 and disposed between the lower end of the longitudinal cylindrical shaft 1 and upper edges of the spaced apart engaging pieces 81 of the movable member 8. When the lever body 40 of the operating lever means 4 is pivoted about the support pin 43 by the user's hand as indicated by the arrow in FIG. 1, the operating piece 41 of the operating lever means 4 is moved upwardly and the towing wire 5 is pulled upwardly. By the upward pulling of the towing wire 5, the movable member 8 is moved upwardly while causing the coil spring 12 to be compressed. When the lever body 40 of the operating lever means 4 is released from the user's hand, the coil spring 12 expands, thereby causing the movable member 8 to be moved downwardly.

The first remover member 9 for forcedly removing weeds and/or mud from the first pinching member 7 includes an elongated-plate-shaped body 90. The elongated-plate-shaped body 90 of the first remover member 9 is angularly bent at a lower end portion thereof, whereby a first remover blade 91 is provided at the lower end portion of the elongated-plate-shaped body 90 of the first remover member 9. Also, the elongated-plate-shaped body 90 of the first remover member 9 is angularly bent at an upper end portion thereof. The elongated-plate-shaped body 90 of the first remover member 9 is formed with a stopper hole 90a, and a vertically extending hole 90b. Further, the elongated-plate-shaped body 90 has notches 90c formed in both sides thereof.

The first remover member 9 is applied onto a side of the vertically extending plate-shaped section 71 of the first pinching member 7 which is opposite to a side of the vertically extending plate-shaped section 71 of the first pinching member 7 at which the second plate-shaped section 72 of the first pinching member 7 extends. The first pinching member 7 and the first remover member 9 are supported to a combination comprising the base frame 6 and the movable member 8 by causing a support pin 92 to be inserted through the stopper hole 90a of the first remover member 9, the vertically extending hole 71c of the first pinching member 7, and the vertically extending hole 62b of the base frame 6, and causing the support pin 92 to be fitted in the stopper hole 80a of the movable member 8. Thus, the first remover member 9 is secured to the movable member 8 by the support pin 92, with a tip end of the first remover blade 91 coming into contact with a surface of the first vertically extending plate-shaped section 71 of the first pinching member 7. Further, a screw pin 93 is inserted through the vertically extending hole 90b of the first remover member 9 through washers 94, and tightened into the tapped hole 71b of the first pinching member 7 and the tapped hole 62a of the base frame 6. Thus, the first pinching member 7 is secured to the base frame 6. When the movable member 8 is moved vertically, the first remover member 9 is vertically slid along the vertically extending plate-shaped section 71 of the first pinching member 7 while being guided by the pin 93.

The second remover member 11 for forcedly removing weeds and/or mud from the second pinching piece 106 of the swinging member 10 includes a body of a substantially U-shape in outline which comprises a pair of spaced apart plate-shaped sections 110 and an intermediate plate-shaped section 112 interconnecting the spaced apart plate-shaped sections 110. The spaced apart plate-shaped sections 110 of the second remover member 11 are provided at upper ends thereof with protruding pieces 114 which project from the upper ends of the spaced apart plate-shaped sections 110 in widthwise directions of the spaced apart plate-shaped sections 110, and vertically extending holes 116. The intermediate plate-shaped section 112 of the second remover member 10 has a second remover blade 118 which is provided at an edge portion of the intermediate plate-shaped section 112 so as to hang down from the intermediate plate-shaped section 112, and extends along the edge portion of the intermediate plate-shaped section 112.

The swinging member 10 includes a pair of spaced apart plate-shaped sections 100, each of the spaced apart plate-shaped sections 100 being formed into a substantially V-shape, an intermediate plate-shaped section 102 interconnecting one ends of the spaced apart plate-shaped sections 100, and a connecting pin 104 provided between the other ends of the spaced apart plate-shaped sections 100. The intermediate plate-shaped section 102 of the swinging member 10 has the first pinching piece 106 which serves as means to pinch weeds in the ground in cooperation with the vertically extending plate-shaped section 71 of the first pinching member 7. The pinching piece 106 is provided at an edge portion of the intermediate plate-shaped section 102 so as to hang down from the intermediate plate-shaped section 102, and extends along the edge portion of the intermediate plate-shaped section 102. The substantially V-shaped plate sections 100 have first receiving holes 108 which are formed in apex portions of the substantially V-shaped plate sections 100, and second receiving holes 109 which are formed in portions of the substantially V-shaped plate sections 100 which are adjacent the apex portions of the substantially V-shaped plate sections 100.

The second remover member 11 is supported to the first remover member 9 combined with the first pinching member 7, by causing the protruding pieces 114 of the second remover member 11 to be engaged with the notches 90c of the first remover member 9. The swinging member 10 receives the second remover member 11 therein and is pivotally supported to the first pinching member 7 with the connecting pin 104 thereof being movably engaged with the notches 81a of the engaging pieces 81 of the movable member 8, and with the intermediate plate-shaped section 102 thereof carrying the intermediate plate-shaped section 112 of the second remover member 11 thereon. More particularly, the swinging member 10 is pivotally supported to the first pinching member 7 by applying the V-shaped plate sections 100 onto outer surfaces of the bracket pieces 71a of the first pinching member 7 and causing support pins 13 to be inserted through the first receiving holes 108 of the V-shaped plate sections 100 and the holes 71a' of the bracket plates 71a of the first pinching member 7. Tip ends of the support pins 13 are received in the vertically extending holes 116 of the second remover member 11. Further, guide pins 15 are inserted through the second receiving holes 109 of the V-shaped plate sections 100 of the swinging member 10. Tip ends of the guide pins 15 are received in the vertically extending holes 116 of the second remover member 11. The second remover blade 118 of the second remover member 11 is contacted with a surface of the second pinching piece 106 of the swinging member 10. The connecting pin 104 of the swinging member 10 is movably engaged with the notches 81a of the engaging pieces 81 of the movable member 8 as discussed above, so that when the movable member 8 is moved upward, the swinging member 10 is swung about the support pins 13 in such a manner that the second pinching piece 106 of the swinging member 10 approaches the vertically extending plate-shaped section 71 of the first pinching member 7. The upward movement of the movable member 8 also causes the first and second remover members 9, 11 to be moved upward.

In the weeder of the present invention which is constructed as described above, the user can handle the weeder in a standing posture without taking an unnatural posture in such a manner to bend the upper half of the user's body, so that the weeder will not impose on the user the physical burden.

Figure 7:
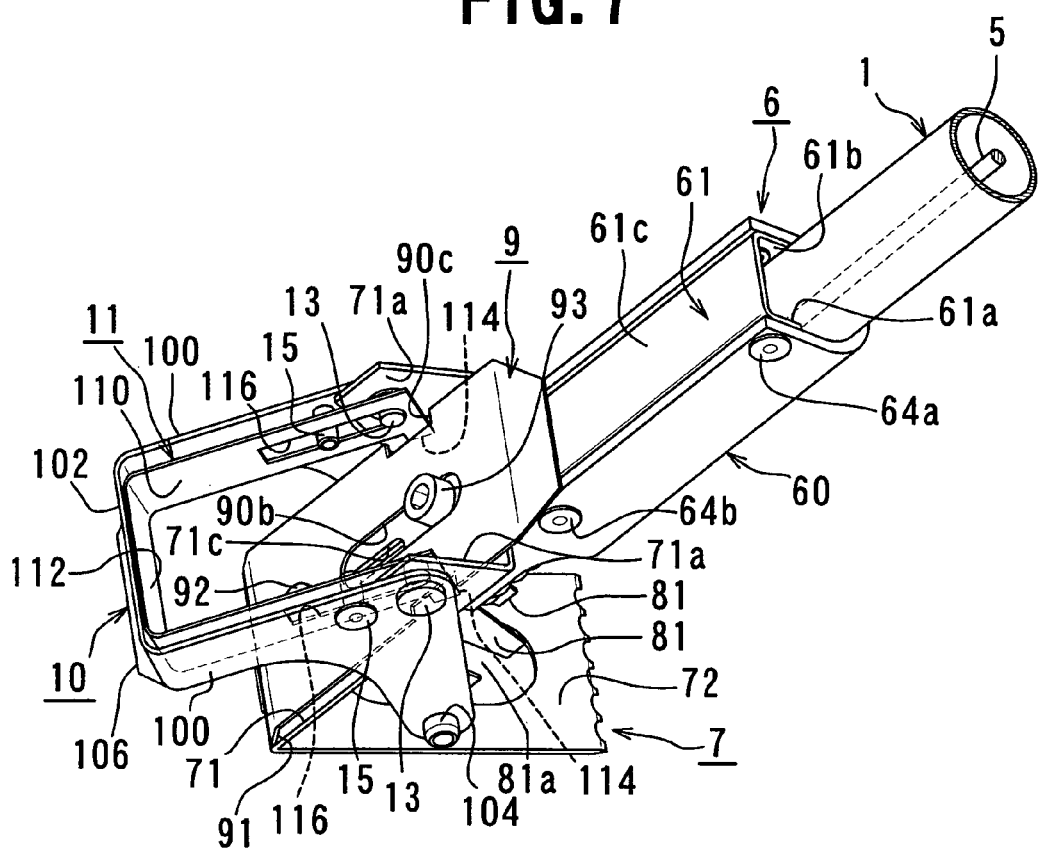
FIG. 7 is a schematic perspective view of the chuck means.
Figure 8:
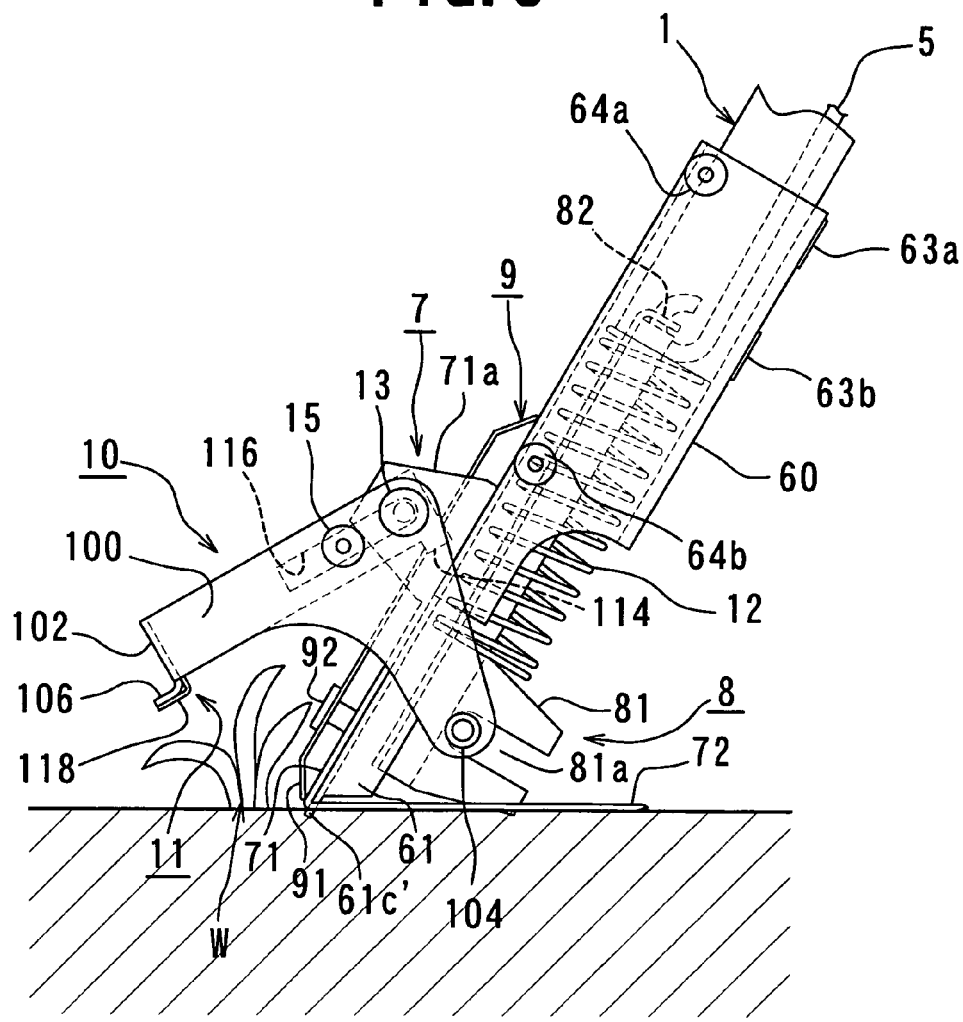
FIGS. 8, 9, 10 and 11 are each a schematic view of the weeder and of assistance in explaining the operation of the weeder.

Referring now to FIGS. 7 to 11, the operation of the weeder according to the embodiment of the present invention will be discussed hereinafter. As long as the operating lever means 4 is not operated by the user, the movable member 8 is urged downwardly by means of the coil spring 12. Therefore, in this condition, the second pinching piece 106 of the swinging member 10 is spaced apart from the vertically extending plate-shaped section 71 of the first pinching member 7 as shown in FIG. 7. When the user is to pick up weeds W in the ground by using the weeder of the present invention, the user grasps the gripping means 2 in a standing posture and places the second plate-shaped section 72 of the first pinching member 7 on an area of the ground in which the weeds W grow, while sticking the lower end 61c' of the second intermediate portion 61c of the base frame 6 into the ground as shown in FIG. 8. In this condition, when the user grasps tightly the lever body 40 of the operating lever means 4 by hand in such a manner to cause the lever body 40 to be pivoted about the support pin 43 as indicated by the arrow in FIG. 1, the operating piece 41 of the operating lever means 4 is moved upwardly and the guide pin 42 is slid upwardly along the vertically extending slit 1a while pulling the towing wire 5 upwardly.

Figure 9:
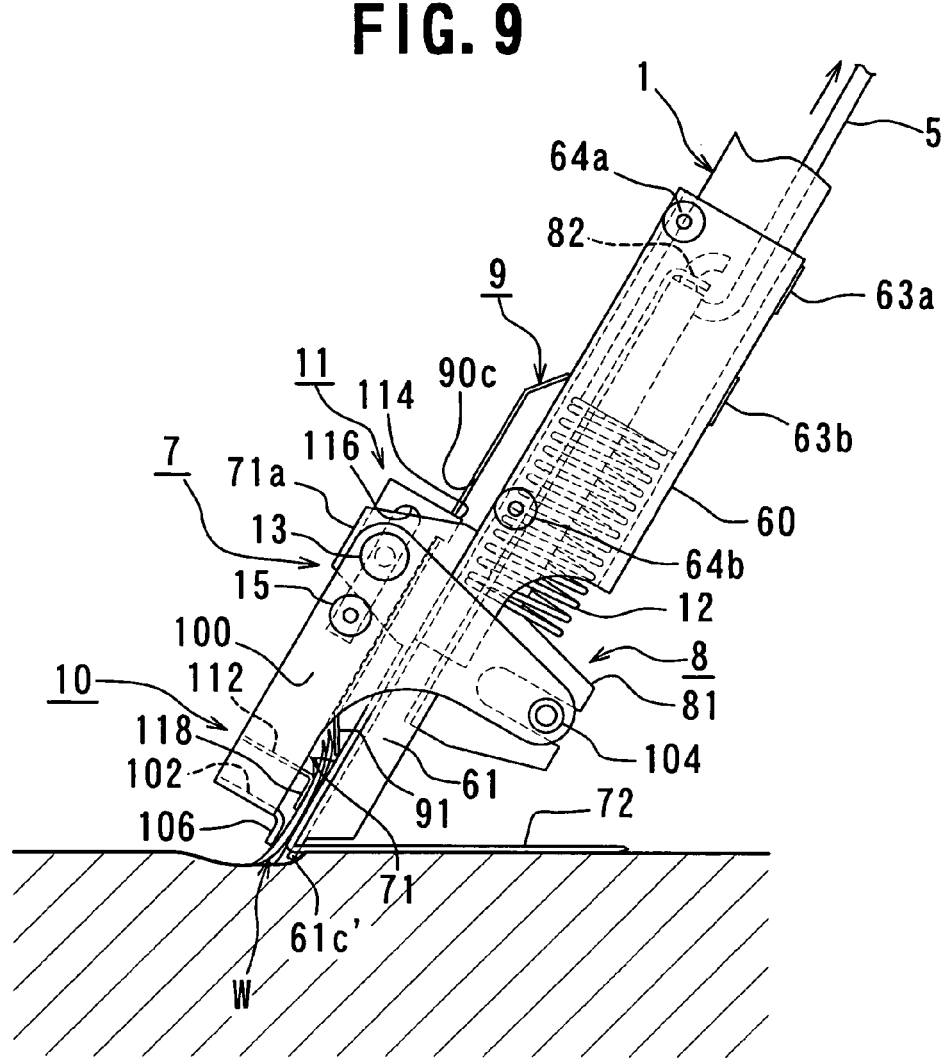
Figure 10:
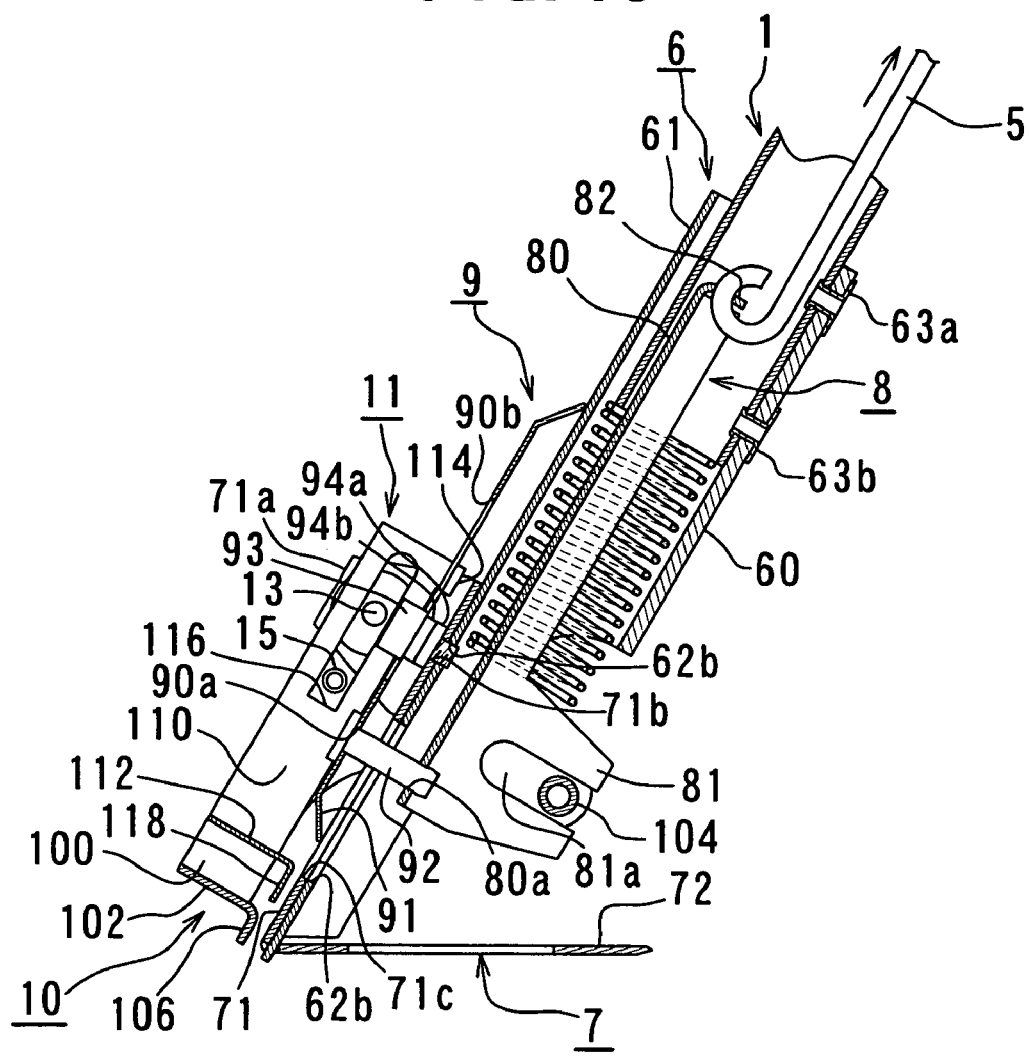

By the upward pulling of the towing wire 5, the movable member 8 is moved upwardly against an action of the coil spring 12 as shown in FIGS. 9 and 10. Simultaneously, the swinging member 10 which is engaged with the engaging pieces 81 of the movable member 8 through the connecting pin 104 of the swinging member 10 and the notches 81a of the engaging pieces 81 is swung about the support pins 13 and the second pinching piece 106 of the swinging member 10 approaches the vertically extending plate-shaped section 71 of the first pinching member 7, whereby the weeds W are pinched between the pinching piece 106 and the vertically extending plate-shaped section 71 of the first pinching member 7 as shown in FIG. 9. In this condition, when the user pulls the longitudinal cylindrical shaft 1 up, the weeds W can be pulled out.

Figure 11:
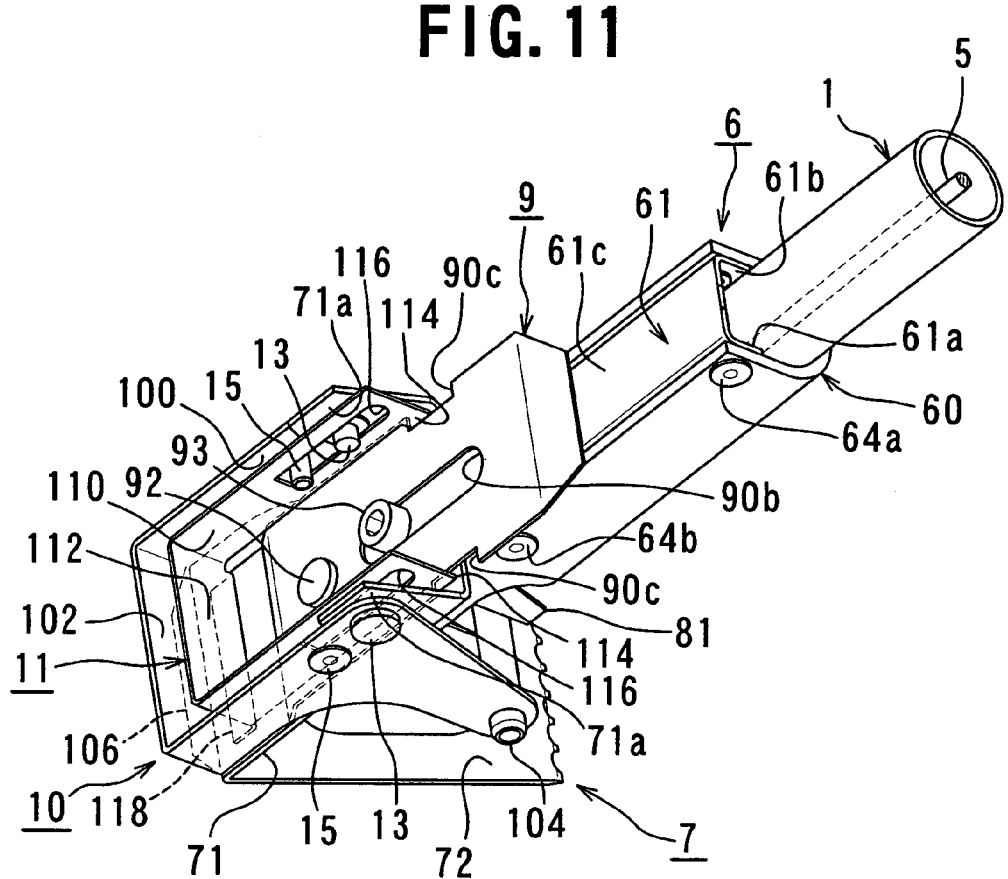

Simultaneously with the upward movement of the movable member 8, the first remover member 9 secured to the movable member 8 by means of the support pin 92 is slid upwardly along the surface of the vertically extending plate-shaped section 71 of the first pinching member 7 while being guided by the pin 93 inserted through the vertically extending hole 90b of the first remover member 9, as shown in FIG. 11. By the upward movement of the first remover member 9, the second remover member 11 which is supported to the first remover member 9 by causing the protruding pieces 114 of the second remover member 11 to be engaged with the notches 90c of the first remover member 9 is moved upwardly in such a manner that the second remover blade 118 of the second remover member 11 is moved apart from the second pinching piece 106 of the swinging member 10, while being guided by the pins 13, 15 inserted through the vertically extending holes 116 of the second remover member 11.

In state where the weeds are chucked between the second pinching piece 106 of the swinging member 10 and the vertically extending plate-shaped section 71 of the first pinching member 7, when the user's grasping force is further still applied to the lever body 40 of the operating lever means 4, it is transmitted to the second pinching piece 106 and the vertically extending plate-shaped section 71 of the first pinching member 7 as a weed-chucking force or a weed-pinching force, so that when the user pulls the longitudinal cylindrical shaft 1 up, the weeds can be securely pulled out by the roots by the cooperation of the second pinching piece 106 and the vertically extending plate-shaped section 71 of the first pinching member 7.

After the weeds are pulled out by the roots by the weeder, when the grasping force having been applied to the operating lever body 40 by the user is released from the operating lever body 40, the coil spring 12 which has been compressed until now expands. As a result, the movable member 8 is moved downwardly due to the action of the coil spring 12, whereby the swinging member 10 which is engaged with the engaging pieces 81 of the movable member 8 through the connecting pin 104 and the notches 81a of the engaging pieces 81 returns to an original position. Simultaneously, the second pinching piece 106 of the swinging member 10 is moved away from the vertically extending plate-shaped section 71 of the first pinching member 7. As a result, the weeds are released from the second pinching piece 106 of the swinging member 10 and the vertically extending plate-shaped section 71 of the first pinching member 7.

Simultaneously with the downward movement of the movable member 8, the first remover member 9 secured to the movable member 8 is moved downwardly while causing the first remover blade 91 of the first remover member 9 to be slid downwardly on the surface of the vertically extending plate-shaped section 71 of the first pinching member 7. Therefore, even if the weeds and/or mud remains attached onto the vertically extending plate-shaped section 71 of the first pinching member 7 after the second pinching piece 106 of the swinging member 10 is moved away from the vertically extending plate-shaped section 71 of the first pinching member 7, the weeds and mud can be positively removed from the vertically extending plate-shaped section 71 of the first pinching member 7 by the downward sliding of the first remover blade 91 on the surface of the vertically extending plate-shaped section 71 of the first pinching member 7. By the downward movement of the first remover member 9, the second remover member 11 supported to the first remover member 9 is also moved downwardly while being guided by the pins 13, 15 inserted through the vertically extending holes 116 of the second remover member 11, and the second remover blade 118 of the second remover member 11 is brought into contact with the surface of the second pinching piece 106 of the swinging member 10 and slid downwardly on the surface of the second pinching piece 106 of the swinging member 10. Therefore, even if the weeds and/or mud remains attached to the second pinching piece 106 of the swinging member 10 after the second pinching piece 106 of the swinging member 10 is moved away from the vertically extending plate-shaped section 71 of the first pinching member 7, the weeds and mud can be positively removed from the second pinching piece 106 of the swinging member 10 by the downward sliding of the second remover blade 118 on the surface of the second pinching piece 106 of the swinging member 10.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A weeder, which a user can handle in a standing posture, comprising:
    a longitudinal shaft having a predetermined length and a longitudinal bore;
    chuck means provided at a lower end portion of said longitudinal shaft for pinching and pulling out weeds in the ground;
    said chuck means including first and second pinching means for pinching the weeds therebetween;
    first remover means combined with said chuck means for forcedly removing the weeds and/or mud from said first pinching means;
    second remover means combined with said chuck means for forcedly removing the weeds and/or mud from said second pinching means;
    operating lever means provided on an axis of said longitudinal shaft for actuating said first and second pinching means and said first and second remover means; and
    a towing wire inserted and extending within said longitudinal bore of said longitudinal shaft, and coupling said chuck means and said operating lever means;
    said chuck means further including an elongated base frame provided at said lower end portion of said longitudinal shaft, said elongated base frame having a first vertically extending hole, a movable member movably received in said longitudinal bore of said longitudinal shaft from a lower end portion of said base member, said movable member being provided with engaging means projecting laterally therefrom, a coil spring mounted around said movable member, and a swinging member, said towing wire being coupled at a lower end thereof to said movable member;

said first pinching means including a body of a substantially L-shape in vertical-section;

said substantially L-shaped body comprising a first vertically extending plate-shaped section serving as means to pinch the weeds in cooperation with said second pinching means, said first vertically extending plate-shaped section having a second vertically extending hole, and a second plate-shaped section serving as means for facilitating standing of said chuck means over the ground, said second plate-shaped section obliquely and upwardly extending from a lower end of said first vertically extending plate-shaped section, and said first plate-shaped section being provided at upper regions of both side edges thereof with bracket pieces which extend in the direction opposite to the direction in which said second plate-shaped section extends;

said first pinching means being supported to said base frame by causing said first vertically extending plate-shaped section to be secured to said base frame;

said swinging member including a pair of first spaced apart plate-shaped sections, a first intermediate plate-shaped section interconnecting said first spaced apart plate-shaped sections, and a connecting pin provided between said first spaced apart sections;

said second pinching means being provided at said first intermediate section of said swinging member;

said swinging member being pivotally supported to said bracket pieces of said first pinching means with said connecting pin thereof being engaged with said engaging means of said movable member;

said first remover means including an elongated-plate-shaped body having notches formed in both sides thereof, said elongated-plate-shaped body being angularly bent at a lower end portion thereof, whereby a first remover blade is provided at said lower end portion of said first remover means;

said first remover means being applied onto a surface of said first vertically extending plate-shaped section of said first pinching means and supported to said movable member so as to be vertically slidable on said surface of said first vertically extending plate-shaped section of said first pinching means, by a pin which penetrates through said second vertically extending hole of said first pinching means and said first vertically extending hole of said base frame;

said second remover means including a pair of second spaced apart plate-shaped sections, a second intermediate plate-shaped section interconnecting said second spaced apart sections, and a second remover blade provided at said second intermediate plate-shaped section of said second remover means, said second spaced apart plate-shaped sections having third vertically extending holes formed therein and protruding pieces provided at upper ends thereof; and said second remover means being received in said swinging member with said protruding pieces thereof being engaged with said notches of said first remover means, with said second remover blade being contacted with said second pinching means, and with said third vertically extending holes thereof receiving guide pins which penetrate through said first spaced apart plate-shaped sections of said swinging member.

\* \* \* \* \*